United States Patent [19]

Tschernatsch

[11] Patent Number: 4,998,855
[45] Date of Patent: Mar. 12, 1991

[54] EQUIPMENT FOR STORING AND UNSTORING BULK MATERIAL

[75] Inventor: Günter Tschernatsch, Schwabach, Fed. Rep. of Germany

[73] Assignee: MAN Gutehoffnungshütte Aktiengesellschaft, Oberhausen, Fed. Rep. of Germany

[21] Appl. No.: 391,457

[22] Filed: Aug. 9, 1989

[30] Foreign Application Priority Data

Aug. 10, 1988 [DE] Fed. Rep. of Germany ....... 3827037

[51] Int. Cl.⁵ ............................................. B65G 65/10
[52] U.S. Cl. ..................................... 414/133; 198/508; 198/519; 414/304
[58] Field of Search ................ 198/508, 519; 414/133, 414/304

[56] References Cited

U.S. PATENT DOCUMENTS

| 3,980,189 | 9/1976 | Proner et al. | 414/133 X |
| 4,154,332 | 5/1979 | Schlegel | 414/133 X |
| 4,244,463 | 1/1981 | Bartley | 198/508 |
| 4,492,508 | 1/1985 | Teske | 414/304 |
| 4,629,060 | 12/1986 | Schlegel et al. | 414/133 X |

FOREIGN PATENT DOCUMENTS 2339394 2/1975 Fed. Rep. of Germany.

Primary Examiner—Robert J. Spar
Assistant Examiner—Janice Krizek
Attorney, Agent, or Firm—Max Fogiel

[57] ABSTRACT

An arrangement for storing and removing bulk material in a round pile, in which a truss is rotatable about a vertical axis on a substructure. The truss carries a material depositing belt and a bulk material receiver which is pivotable in a vertical direction. A counterweight on the truss balances weight. The substructure is hopper-shaped. The truss is mounted on the substructure by a bearing, and rollers carry the truss which runs on the substructure. The bulk material receiver is in the form of a drag that conveys to a hopper of the substructure. This hopper has a bottom with a conveying medium under which a conveyor belt runs. The bearing has a large diameter annular track that is elevated on posts on the substructure. A rotatable plough located at the bottom of the hopper is the single conveying element on the hopper bottom.

2 Claims, 2 Drawing Sheets

EQUIPMENT FOR STORING AND UNSTORING BULK MATERIAL

The invention concerns equipment for storing and unstoring bulk material in a round pile, consisting of a substructure and of a latticework jib that rotates around a vertical axis thereon, that has a material-depositing belt, a vertically pivoting material-interception mechanism, and a counterweight for balancing the weight of the material, and that is mounted on the substructure on a rotating bearing.

Combining a depositing belt with an interception mechanism for the purpose of loading and unloading bulk material in an oblong pile is known. The interception mechanism is a bucket wheel mounted on the free of a boom that pivots vertically in a jib. The boom has a counterweight to balance the weight of the material. The boom's pivoting action allows it to move vertically. To allow the jib to rotate, it is mounted on the substructure on a live-ring. Articulated to the top of the cylindrical jib is depositing belt that releases the material onto the pile. The substructure travels longitudinally, along with its associated components, on a track.

Equipment of this type can establish or disestablish only longitudinal piles because the boom can execute only circular and vertical motions around an axis in the jib, and can accordingly not remove round piles, which tend to subside conically inward (German OS 2 339 394).

With equipment of this genus as a point of departure, the object of the present invention is to provide equipment that allows the most reasonable possible establishment and disestablishment of round piles but also the creation of a reserve supply in the form of a "dead" pile.

This object is attained in accordance with the invention in that the rotating bearing is a long-diameter annular track elevated on posts on a hopper-shaped substructure with the jib traveling on it on rollers, in that the interception mechanism is a drag that conveys directly into a hopper in the substructure, and in that a rotating plow is accommodated in the bottom of the hopper with a conveyor belt traveling underneath it.

The extensive support provided by the elevated annular track eliminates the need to support the jib on an exterior annular track, making it possible to also create a dead-pile around the central pile to act as a reserve supply when necessary. The elevated track also allows the drag to store the material directly in the substructure's hopper.

The drag in one advantageous embodiment of the invention is in two parts, one on each side of the depositing belt, and the end of the drag that faces the substructure pivots vertically on the jib at the latter's upper edge.

Positioning the drag symmetrically with respect to the depositing belt relieves the jib of any torque resulting from unequally distributed weight and increases the rate of conveyance.

In another embodiment of the invention, the depositing belt is raised and lowered by a cable at the free end of the jib.

The depositing belt can accordingly be raised and lowered to adjust how far the material has to fall when being added to the pile, eliminating dust.

One embodiment of the invention is illustrated in the drawings, wherein

Figure 1:
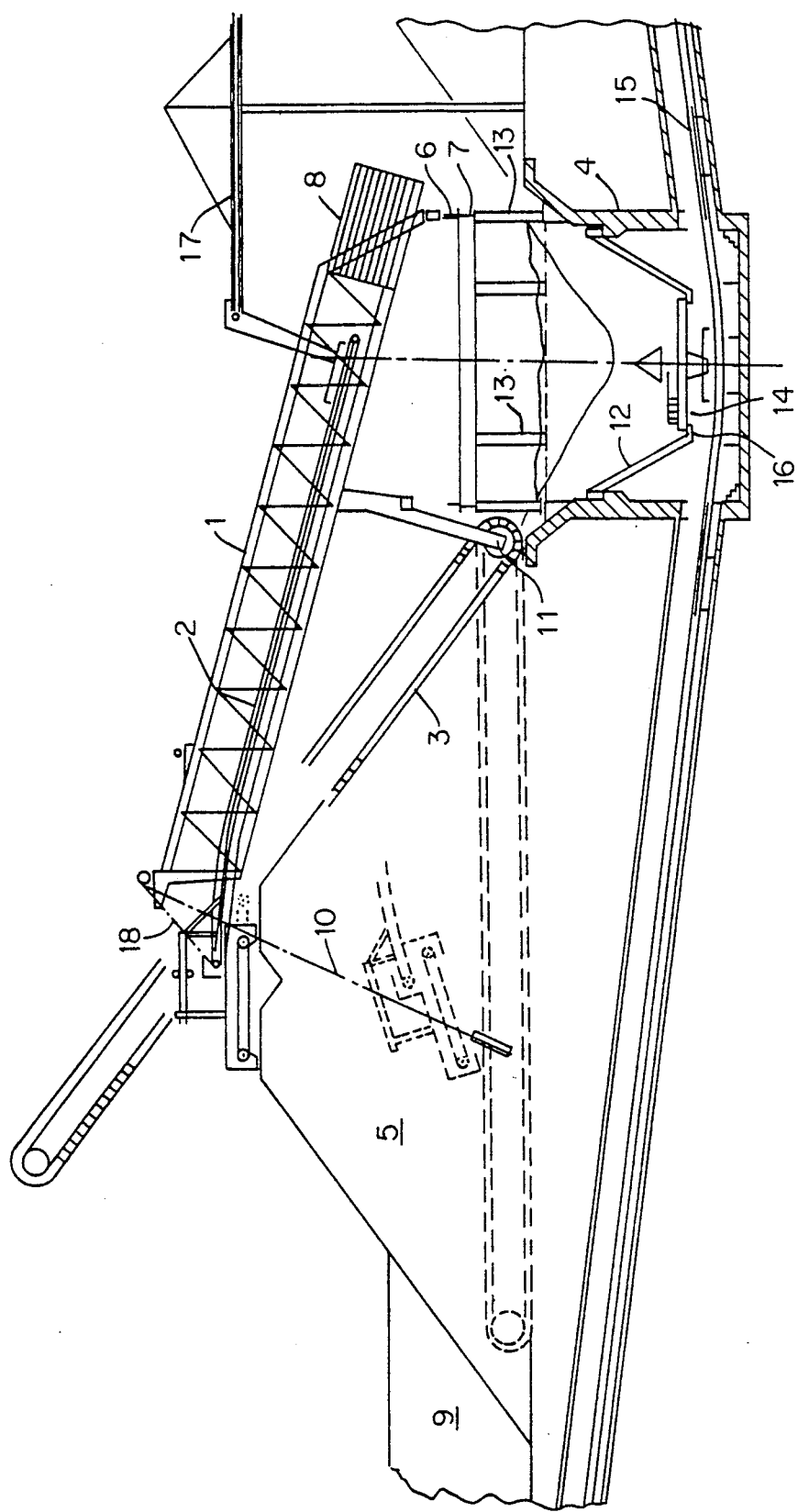
FIG. 1 is a side view of the equipment.

FIG. 1 is a section through the overall equipment, which consists essentially of a latticework jib 1, a depositing belt 2, two drags 3, and a substructure 4. To allow establishment of a round pile 5, jib 1 rotates on rollers 6 and an annular track 7 around a vertical axis on substructure 4. Since the diameter of track 7 is, in accordance with the invention, long, the jib is extensively supported, and jib 1, which has a counterweight 8, can be freely supporting. Counterweight 8 also helps distribute the weight on rollers 6.

The jib accordingly does not need to be conventionally supported against an annular track around annular pile 5, and it now becomes possible for the first time to create a reserve supply in the form of a dead-pile 9.

Drag 3, which is suspended from a cable 10 and pivots vertically around a horizontal shaft 11 secured to the jib, is mounted in jib 1. Drag 3 removes bulk material, coal for example, from pile 5. The drag scrapes material off the conical inner surface of the pile and conveys it directly into a hopper 12 in substructure 4.

In accordance with one particular feature of the invention, track 7 is elevated above substructure 4 on posts 13. This characteristic makes it possible for the first time for the drag 3 to convey directly into hopper 12 in an especially rational way. The material removed by drag 3 travels from hopper 12 through a rotating plow 14 and onto a conveyor belt 15, which releases it for shipment by rail or water. The plow prevents the outlet 16 of hopper 12 from clogging up.

Material loaded off a train or ship by a belt 17 is dumped onto depositing belt 2, which deposits it on the pile. Depositing belt 2 can be raised and lowered at the free end of jib 1 by a cable 18.

Once pile 5 has been established, dead-pile 9 can be created around it. To convey material from the dead-pile it must be bulldozed to the center, where drag 3 has access to it.

Figure 2:
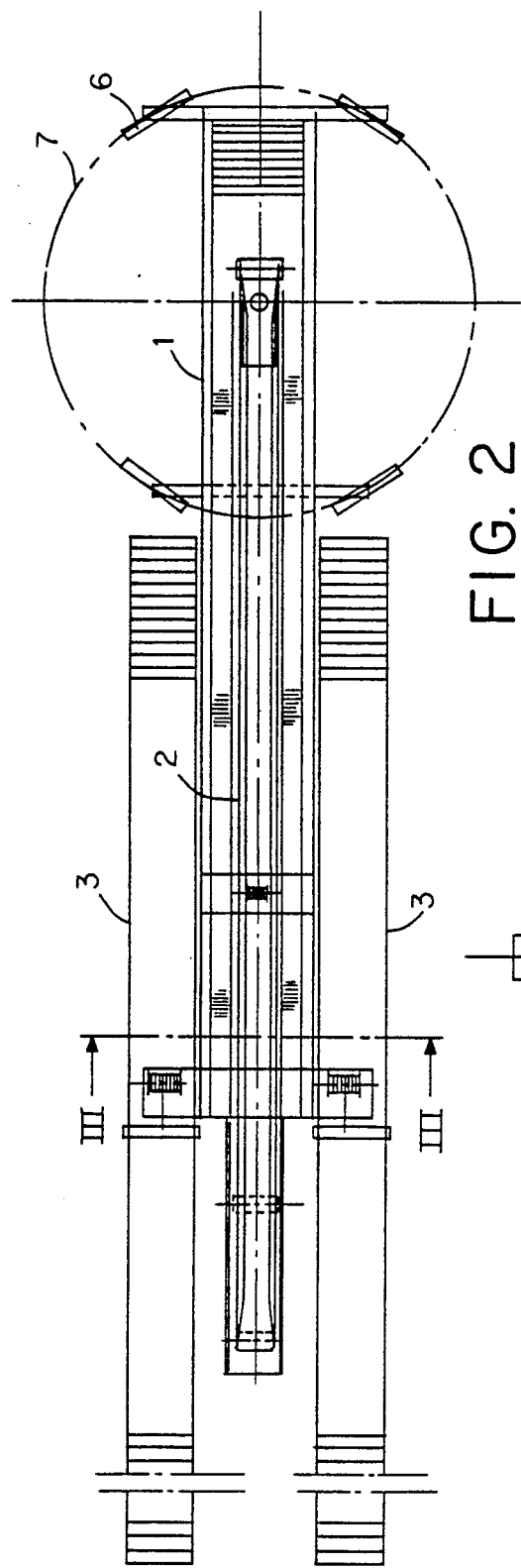
FIG. 2 is a top view of the jib with drags and depositing belt.

FIG. 2 is a top view of the equipment. Jib 1 revolves horizontally approximately 320° on rollers 6 on track 7. The two drags 3 are positioned on each side of depositing belt 2, which distributes the weight to advantage.

Figure 3:
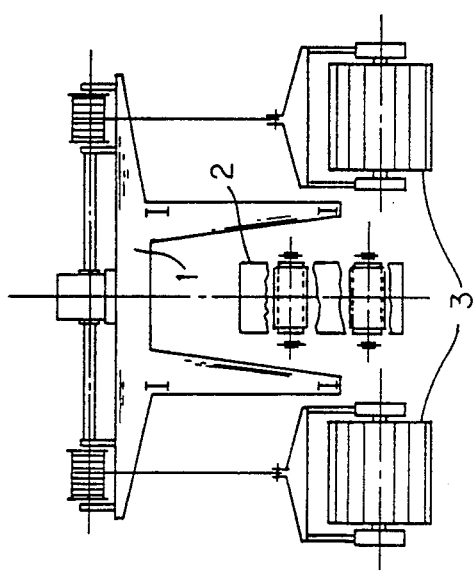
FIG. 3 is a section along the line III—III in FIG. 2.

FIG. 3 is a section through jib 1 along the line III—III in FIG. 2. Depositing belt 2 extends along the midline of jib 1.

Since the drags 3 on each side of jib 1 can be raised and lowered by cable 10, the material can be continuously scraped from the inner surface of pile 5 and supplied for removal to conveyor belt 15 by way of hopper 12 (FIG. 1).

I claim:

1. An arrangement for storing and removing from storage bulk material in a round pile, comprising: a substructure; a truss rotatable about a vertical axis on said substructure; a material depositing belt and a bulk material receiving means carried by said truss, said receiving means being pivotable in a vertical direction; a counterweight on said truss for balancing weight, said substructure being hopper-shaped; a bearing, said truss being mounted on said substructure by said bearing; rollers carrying said truss, said truss running on said substructure through said rollers; said bulk material receiving means comprising a drag conveying material to a hopper of said substructure, said hopper having a bottom with a single conveying medium; a conveyor belt running under said conveying medium; said bearing having a large-diameter annular track elevated on posts on said substructure; and said single conveying medium being in the form of a rotatable plough at the bottom of said hopper; said drag comprising two parts, one of said parts being located on one side of said material depositing belt and the other of said parts being located on the other side of said material depositing belt; said drag having an end facing said substructure and pivoting about a horizontal shaft.

2. An arrangement for storing and removing from storage bulk material in a round pile, comprising: a substructure; a truss rotatable about a vertical axis on said substructure; a material depositing belt and a bulk material receiving means carried by said truss, said receiving means being pivotable in a vertical direction; a counterweight on said truss for balancing weight, said substructure being hopper-shaped; a bearing, said truss being mounted on said substructure by said bearing; rollers carrying said truss, said truss running on said substructure through said rollers; said bulk material receiving means comprising a drag conveying material to a hopper of said substructure, said hopper having a bottom with a single conveying medium; a conveyor belt running under said conveying medium; said bearing having a large-diameter annular track elevated on posts on said substructure; and said single conveying medium being in the form of a rotatable plough at the bottom of said hopper; said drag comprising two parts, one of said parts being located on one side of said material depositing belt and the outer other of said parts being located on the other side of said material depositing belt, said drag having an end facing said substructure and pivoting about a horizontal shaft; said truss having a free end; and a cable for raising and lowering said material depositing belt at said free end.

* * * * *